United States Patent [19]

Stone et al.

[11] 4,236,687
[45] Dec. 2, 1980

[54] EJECTION SEAT WITH PITCH, ROLL AND YAW CONTROL

[75] Inventors: W. James Stone, Ridgecrest, Calif.; Lovic P. Thomas, Valparaiso, Fla.

[73] Assignee: The United States of America as represented by the Secretary of the Navy, Washington, D.C.

[21] Appl. No.: 42,170

[22] Filed: May 24, 1979

[51] Int. Cl.³ .................................................. B64D 25/10
[52] U.S. Cl. .............................. 244/122 AD; 244/177
[58] Field of Search ........ 244/122 R, 122 A, 122 AB, 244/122 AC, 122 AD, 122 AE, 122 AH, 141, 3.22, 164, 167, 171, 177; 364/434

[56] References Cited

U.S. PATENT DOCUMENTS

| | | |
|---|---|---|
| 3,362,662 | 1/1968 | McIntyre et al. ..................... 244/122 |
| 3,421,720 | 1/1969 | MacDonald et al. ........... 244/122 R |
| 3,487,445 | 12/1969 | Gluhareff et al. ............ 244/122 AD |
| 3,592,419 | 7/1971 | Hantzsch .............................. 244/122 |
| 3,979,089 | 9/1976 | Miller et al. .................. 244/122 AD |
| 4,017,040 | 4/1977 | Dillinger et al. ............. 244/122 AD |

FOREIGN PATENT DOCUMENTS 1226991  3/1971  United Kingdom ..................... 244/141

Primary Examiner—Charles E. Frankfort
Attorney, Agent, or Firm—R. S. Sciascia; W. Thom Skeer

[57] ABSTRACT

An aircraft ejection seat having pitch, roll, and yaw control. Two gimballed rocket motors are attached to an aircraft ejection seat. A servo control circuit rotates the rocket motors in response to command signals.

11 Claims, 2 Drawing Figures

EJECTION SEAT WITH PITCH, ROLL AND YAW CONTROL

BACKGROUND OF THE INVENTION

1. Field of the Invention

The present invention relates generally to aircraft ejection seats and, more particularly, to an ejection seat having pitch, roll, and yaw control after ejection from an aircraft has occurred.

2. Description of the Prior Art

Prior art ejection seats have been provided with a fixed rocket motor or cartridge. The rocket motor or cartridge has been rigidly attached to the ejection seat; and, once fired, the motor or cartridge and seat have gone in the direction which they were pointed when firing occurred. Since one does not know in advance what attitude an aircraft might be in when a crew member ejects, ejection may be in some direction where it is difficult for the parachute to deploy properly. Other prior art aircraft ejection seats have had gimballed rocket motors. However, when a single gimballed rocket motor is utilized one does not obtain yaw control.

SUMMARY OF THE INVENTION

An object of the present invention is to provide an aircraft ejection seat having pitch, roll, and yaw control. Ejection seats without such control are hazardous to use because rotations cause the parachute to be difficult or impossible to deploy, sometimes resulting in parachute failure.

The present invention provides an aircraft ejection seat having two gimballed rocket motors which may be attached either below or behind the seat. A control circuit causes the gimballed rocket motors to rotate in response to pitch and yaw command signals. A pitch command signal alone causes both gimballed rocket motors to have identical angular displacements so that the thrust vectors from the gimballed rocket motors are always parallel. A yaw command signal, either alone or combined with a pitch command signal, causes the gimballed rocket motors to have different angular displacements; and the non-parallel thrust vectors cause a torque about the yaw axis of the ejection seat.

The gimballed rocket motors are moved by servo-controlled hydraulic actuators connected between the rocket motor housings and the frame of the ejection seat. A yaw rate signal is processed by a computer to determine the yaw angle of the seat. Yaw rate and yaw angle signals are combined by a summer to produce a negative yaw feedback signal which is connected to the input of the control system.

DESCRIPTION OF THE PREFERRED EMBODIMENT

Figure 1:
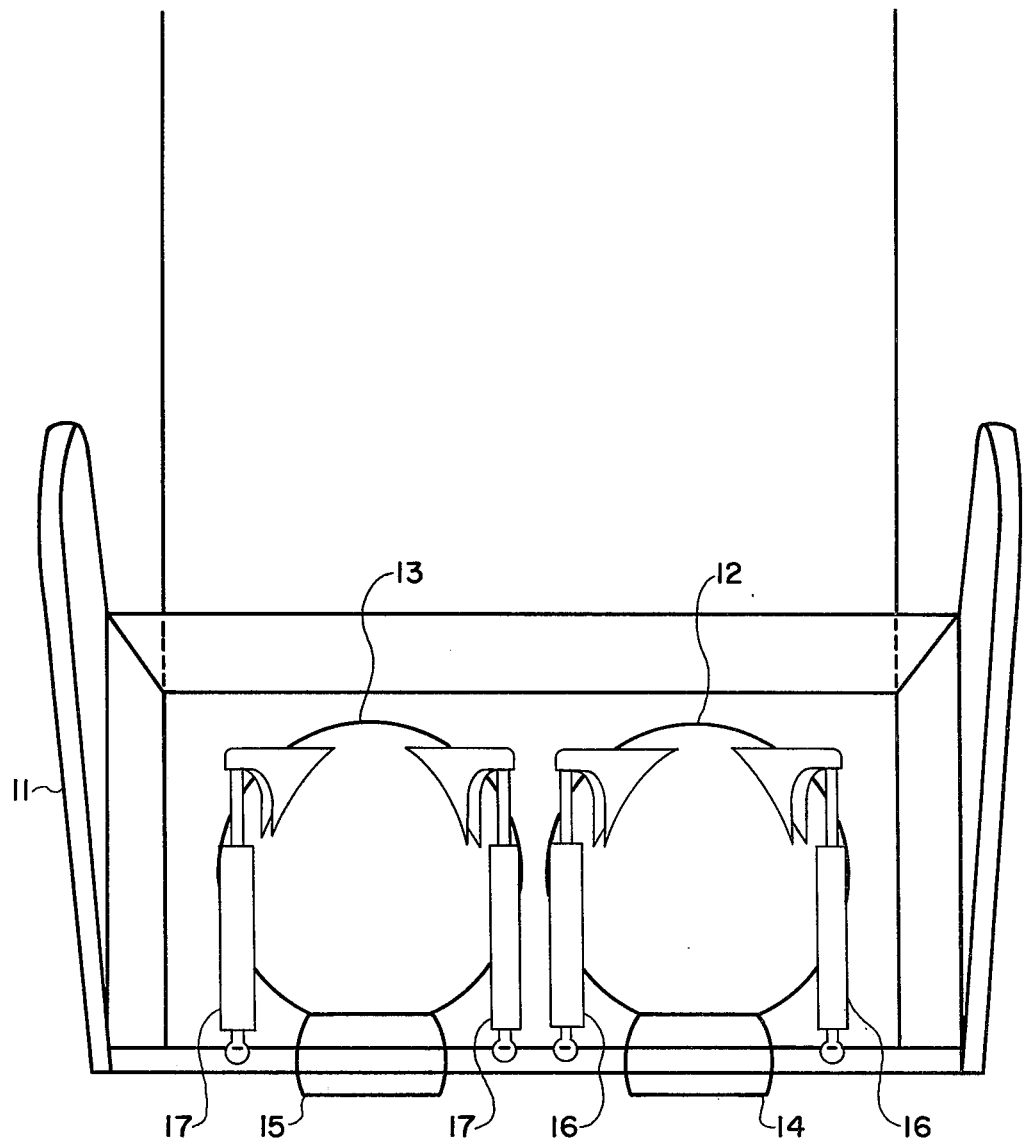
FIG. 1 illustrates gimballed rocket motors mounted in an aircraft ejection seat.
Figure 2:
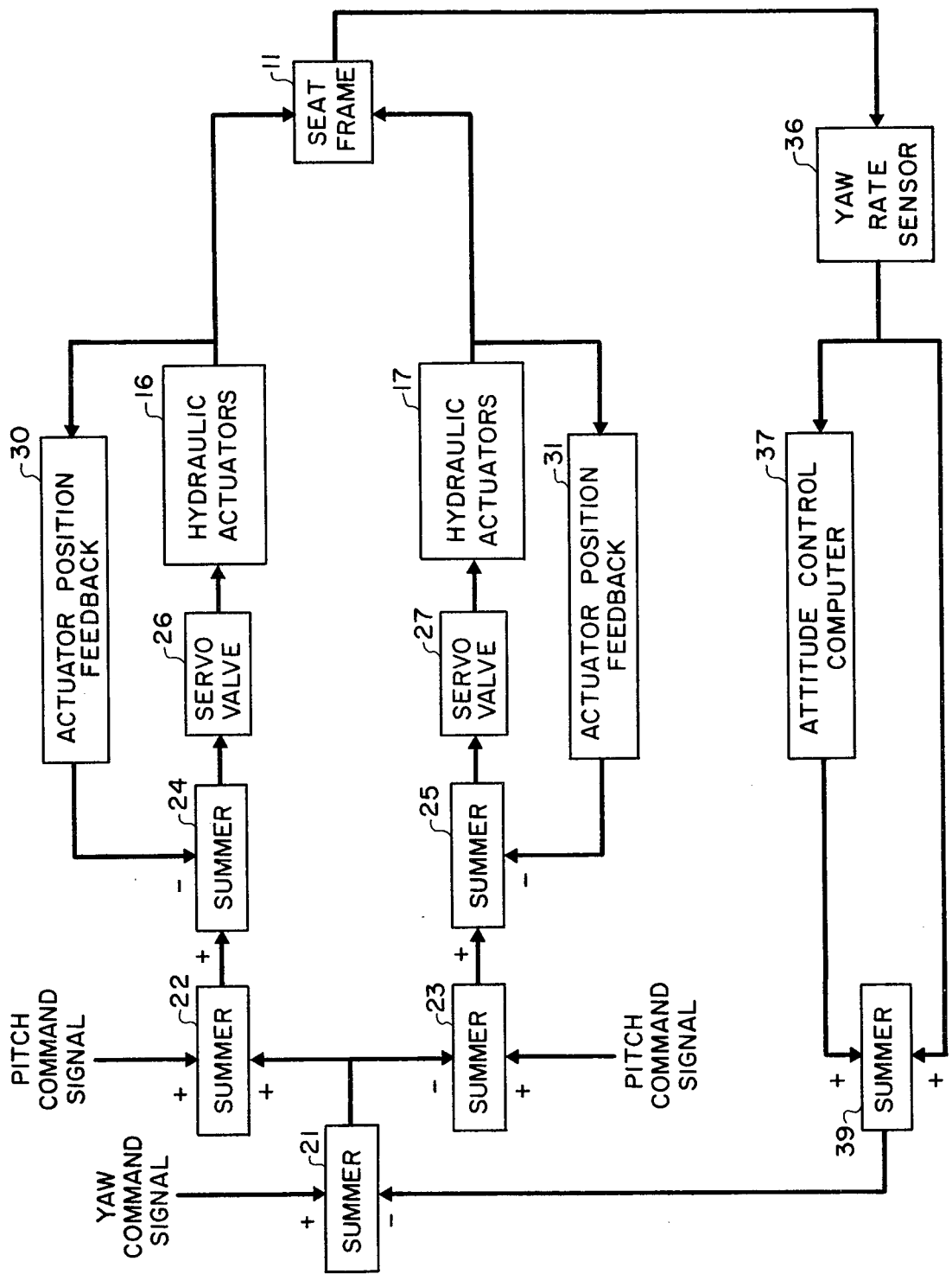
FIG. 2 is a block diagram of the motor control system.

Referring to FIG. 1, an aircraft ejection seat 11 has a thrust producing means, which may be a right rocket motor 12 and a left rocket motor 13, attached near the bottom of ejection seat 11. Rocket motors 12 and 13 are mounted on gimbals 14 and 15 respectively. The spatial orientation of rocket motors 12 relative to ejection seat 11 is controlled by two hydraulic actuators 16, and two hydraulic actuators 17 perform the same function for left rocket motor 13. FIG. 2 is a block diagram of the system that controls the direction of the thrust of rocket motors 12 and 13. Rocket motors 12 and 13 have equal thrust vectors when it is necessary to change pitch, but the thrust vectors of rocket motors 12 and 13 are not parallel when changing the yaw of ejection seat 11.

An attitude sensor, not shown, sends a yaw command signal to a summer 21 which provides a yaw control signal to a summer 22 that produces an output equal to the sum of the output of summer 21 and a pitch command signal from the attitude sensor. The output of summer 22 is connected to a summer 24 which supplies a signal to a servo valve 26 which controls hydraulic actuators 16. The voltage supplied to servo valve 26 determines the position of a spool in servo 26 which causes hydraulic actuators 16 to expand, contract, or remain stationary. The length of actuators 16 determines the direction of the thrust vector of rocket motor 12. An actuator position feedback circuit 30, which may be a potentiometer connected between the ends of hydraulic actuator 16, sends negative feedback of actuator position to summer 24. Actuator position feedback causes hydraulic actuators 16 to move to the desired positions with minimal command error.

The output of summer 21 is also connected to a summer 23, which subtracts the output of summer 21 from the pitch command signal and which has its output connected to a summer 25. Summer 25, a servo valve 27, hydraulic actuators 17 and actuator position feedback circuit 31 perform the same functions for left rocket motor 13 that summer 24, servo valve 26, hydraulic acutator 16, and actuator position feedback circuit 30 perform for right rocket motor 12.

Since summer 22 adds the output of summer 21 to the pitch command signal, while summer 23 subtracts the output of summer 21 from the pitch command signal, the signal which summer 22 sends to summer 24 differs from the signal which summer 23 sends to summer 25 if a yaw command signal is applied to summer 21. Therefore, the two pairs of hydraulic actuators 16 and 17 receive differential pitch signals, resulting in non-parallel thrust vectors for rocket motors 12 and 13, which causes the thrust of gimballed rocket motors 12 and 13 to produce a torque about the yaw axis of ejection seat 11.

A yaw rate sensor 36 is connected to ejection seat frame 11. The output of yaw rate sensor 36 is connected to an attitude control computer 37, which may be a microprocessor. That microprocessor known as an 8080 microprocessor has functioned satisfactorily in developmental models of the invention. Attitude control computer 37 computes the yaw angle of ejection seat 11 and sends a yaw angle signal to a summer 39, which is also connected to yaw rate sensor 36. The yaw angle signal and the signal from yaw rate sensor 36 are combined by summer 39 to produce a negative yaw feedback signal which is connected to summer 21 and thereby combined with the yaw command signal. Therefore, the output of summer 21 is the sum of the yaw command signal and the negative yaw feedback signal received from summer 39.

The foregoing description and appended claims provide an aircraft ejection seat having pitch and yaw control, which was an object of the invention.

What is claimed is:

1. An aircraft ejection seat, comprising:

a first gimbal system mounted on the bottom of said aircraft ejection seat;

a first means for producing thrust mounted on said first gimbal system;

a second gimbal system mounted on said aircraft ejection seat;

a second means for producing thrust mounted on said second gimbal system;

means for controlling the directions of the thrusts of said first and second means for producing thrust and connected thereto comprising;

first and second actuators connected between said aircraft ejection seat and said first means for producing thrust;

third and fourth actuators connected between said aircraft ejection seat and said second means for producing thrust;

a first summer having first and second inputs and an output, said first input responsive to a yaw command signal;

feedback means for providing a negative yaw feedback signal connected to said second input of said first summer;

a second summer connected to said first summer and to a pitch command signal, said second summer configured to have an output equal to the sum of the output of said first summer and the pitch command signal;

first positioning means for controlling the positions of said first and second actuators and connected to said second summer;

a third summer connected to said first summer and responsive to the pitch command signal, said third summer configured to have an output equal to the pitch command signal minus the output of said first summer; and second positioning means for controlling the positions of said third and fourth actuators and connected to said third summer.

2. An aircraft ejection seat according to claim 1 wherein said first and second means for producing thrust are rocket motors.

3. An aircraft ejection seat according to claim 1 wherein said first positioning means comprises:

a fourth summer connected to said second summer for producing an output responsive to the output of said second summer and the positions of said first and second actuators; and first servo means for controlling said first and second actuators and connected between the output of said fourth summer and said first and second actuators.

4. An aircraft ejection seat according to claim 3 wherein said first positioning means further comprises a first actuator position feedback circuit connected between at least one of said first and second actuators and said fourth summer.

5. An aircraft ejection seat according to claim 1 wherein said second positioning means further comprises:

a fifth summer connected to said third summer for producing an output responsive to the output of said third summer and the positions of said third and fourth actuators; and second servo means for controlling said third and fourth actuators and connected between the output of said fifth summer and said third and fourth actuators.

6. An aircraft ejection seat according to claim 5 wherein said second positioning means includes a second actuator position feedback circuit connected between at least one of said third and fourth actuators and said fifth summer.

7. An aircraft ejection seat according to claim 1 wherein said feedback means comprises:

a yaw rate sensor connected to said aircraft ejection seat;

an attitude control computer, connected to said yaw rate sensor, for computing a yaw angle signal proportional to the yaw angle of said aircraft ejection seat;

a sixth summer having first and second inputs and an output, said first input connected to said attitude control computer, said second input connected to said yaw rate sensor, said output connected to said second input of said first summer, said sixth summer configured to combine the yaw angle signal and the output of said yaw rate sensor to produce said negative yaw feedback signal.

8. An aircraft ejection seat according to claim 7 wherein said attitude control computer comprises a microprocessor.

9. An attitude control system for an aircraft ejection seat comprising:

a first summer having first and second inputs, said first input responsive to a yaw command signal;

feedback means for providing a negative yaw feedback signal connected to the second input of said first summer, said first summer adding the yaw command signal to produce a yaw control signal;

a second summer connected to said first summer and to a pitch command signal, said second summer configured to have an output equal to the sum of the pitch command signal and the yaw control signal;

a third summer connected to said first summer and to the pitch command signal;

said third summer configured to have an output equal to the pitch command signal minus the yaw control signal;

a fourth summer having two inputs, said first input connected to said output of said second summer;

a first servo valve for producing a hydraulic control pressure connected to said fourth summer;

a first gimbal system mounted on the bottom of said aircraft ejection seat;

first means for producing thrust mounted on said first gimbal system;

a first hydraulic actuator connected to said first servo valve;

a second hydraulic actuator connected to said first servo valve, said first and second hydraulic actuators connected between said first means for producing thrust and said aircraft ejection seat;

a first actuator position feedback circuit responsive to the positions of said first and second hydraulic actuators, connected thereto, for providing a negative actuator position feedback signal to said second input of said fourth summer;

a fifth summer having two inputs, said first input connected to the output of said third summer;

a second servo valve for producing a hydraulic control pressure connected to said fifth summer;

a second gimbal system mounted beside said first gimbal system on said aircraft ejection seat;

second means for producing thrust mounted on said second gimbal system;

a third hydraulic actuator connected to said second servo valve;

a fourth hydraulic actuator connected to said second servo valve, said third and fourth hydraulic actuators connected between said second means for producing thrust and said aircraft ejection seat;

a second actuator position feedback circuit responsive to the positions of said third and fourth hydraulic actuators, connected thereto, for providing a negative actuator position feedback signal to said second input of said fifth summer.

10. An attitude control system for an aircraft ejection seat according to claim 9 wherein said feedback means comprises:

a yaw rate sensor connected to said aircraft ejection seat;

an attitude control computer, connected to said yaw rate sensor, for computing a yaw angle signal proportional to the yaw angle of said aircraft ejection seat;

a sixth summer having first and second inputs and an output, said first input connected to said attitude control computer, said second input connected to said yaw rate sensor, said output connected to said second input of said first summer, said sixth summer configured to combine the yaw angle signal and the output of said yaw rate sensor to produce said negative yaw feedback signal.

11. An attitude control system for an aircraft ejection seat according to claim 9 wherein said first and second means for producing thrust are rocket motors.

* * * * *